United States Patent
Crall et al.

(10) Patent No.: US 6,439,838 B1
(45) Date of Patent: Aug. 27, 2002

(54) PERIODIC STATOR AIRFOILS

(75) Inventors: David W. Crall, Loveland; Steven R. Manwaring, Lebanon, both of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/466,157

(22) Filed: Dec. 18, 1999

(51) Int. Cl.⁷ .............................. F01D 9/00; F04D 29/66
(52) U.S. Cl. ......................... 415/119; 415/194; 415/195
(58) Field of Search ................................. 415/119, 194, 415/195

(56) References Cited

U.S. PATENT DOCUMENTS

| | | | | |
|---|---|---|---|---|
| 1,534,721 A | * | 4/1925 | Lasche | 415/119 X |
| 3,006,603 A | * | 10/1961 | Caruso et al. | 415/119 X |
| 3,058,528 A | * | 10/1962 | Hiersch | 415/119 X |
| 3,169,747 A | * | 2/1965 | Seymour | 415/119 X |
| 3,745,629 A | * | 7/1973 | Pask et al. | 415/119 X |
| 4,253,800 A | * | 3/1981 | Segawa et al. | 415/119 X |
| 4,474,534 A | * | 10/1984 | Thode | 415/119 X |
| 5,342,167 A | * | 8/1994 | Rosseau | 415/119 |
| 5,984,631 A | * | 11/1999 | Tolgos | 415/119 X |

OTHER PUBLICATIONS

Finkelstein, "Experimental Evaluation of Irregularly Spaced Nozzle Vanes Effect Upon Blade Vibration in a Radial–Flow Gas Turbine," ASME 67–VIBR–42, 1967, 4 pages.

Kemp et al, "Theoretical and Experimental Analysis of the Reduction of Rotor Blade Vibration in Turbomachinery Through the use of Modified Stator Vane Spacing," NACATN 4373, Sep. 1958, pp:1–43.

* cited by examiner

Primary Examiner—John E. Ryznic
(74) Attorney, Agent, or Firm—Rodney M. Young; Francis L. Conte

(57) ABSTRACT

A stator includes a row of airfoils extending inwardly from a casing. The airfoils are spaced apart circumferentially from each other at a spacing varying in turn around the perimeter of the casing for reducing vibratory excitation of a downstream rotor stage.

20 Claims, 2 Drawing Sheets

PERIODIC STATOR AIRFOILS

BACKGROUND OF THE INVENTION

The present invention relates generally to gas turbine engines, and, more specifically, to stators therein.

In a gas turbine engine, air is pressurized by rotating blades and mixed with fuel and ignited for generating hot combustion gases which flow downstream through a turbine for extracting energy therefrom.

In a turbofan engine, the air is channeled through rows of fan and compressor blades which pressurize the air in turn. The fan blades are relatively large, with the subsequent rows of rotor blades decreasing in size to further compress the air in turn.

In order to aerodynamically guide the air to the several rotor stages, corresponding stators are disposed upstream therefrom. A typical stator includes a row of stator airfoils extending radially inwardly from a supporting annular casing, with the airfoils being configured for decelerating the air to the corresponding row of rotor blades.

Aerodynamic efficiency of a turbine engine is the paramount design objective. The stator and rotor airfoils are configured to cooperate with maximum efficiency and performance. In the fan and compressor components of the engine, aerodynamic performance also includes a suitable stall margin for preventing undesirable stall as the air is pressurized over engine speeds and output power varying from minimum to maximum values.

Another significant design consideration for rotor blades is fatigue life. Since the blades rotate during operation and are subject to various excitation forces, vibratory stress and strain are developed in the blades during operation. The blades are therefore designed to minimize excited vibrations for ensuring a suitable fatigue life.

The combination of aerodynamic performance and vibratory response is particularly significant in the front frame of a low bypass, turbofan gas turbine engine. The front frame includes stator airfoils in the form of struts, either used alone or in combination with variable inlet guide vanes. These struts extend radially between an inner hub and an outer casing and direct ambient air into the first stage of fan blades. Since first stage fan blades are relatively large, their aerodynamic performance and vibratory response are particularly sensitive to interaction with the front frame.

More specifically, the frame struts locally block the aerodynamic flowpath to the fan blades. Accordingly, the inlet air is diverted around the struts into the circumferential passages therebetween, and wakes are formed at the trailing edges of the struts. The pressure profile of the inlet air to the fan blades therefore varies circumferentially around the front frame, which correspondingly aerodynamically affects performance of the blades.

In a typical production engine, the fan struts are equally spaced apart circumferentially and effect a fundamental excitation or forcing frequency, also referred to as a wake passing frequency. This frequency is the product of the total number of struts and the speed of rotation of the fan. Should the wake passing frequency match a natural resonant frequency of the blades, the blades can be driven to relatively high vibratory stress and strain which adversely affects the fatigue life thereof.

A row of fan blades has a fundamental resonant frequency and higher order harmonic frequencies thereof. Similarly, the wake passing frequency has higher order harmonic frequencies. And, since a fan operates with varying speed from idle to maximum speed, at least one resonant crossing of the wake passing frequency, or its harmonics, with the resonant frequencies of the fan will typically occur.

The most common method of minimizing resonant response of the fan blades is to select the number of struts to ensure that resonant crossing with susceptible blade vibratory modes is avoided. Since some blade vibratory modes are more excitable than others, operation near those excitable modes is typically avoided if possible.

Since the fundamental excitation frequency corresponds with the total number of airfoils in the row, the excitation forces corresponding therewith repeat for every revolution of the rotor. This fundamental frequency is commonly expressed per revolution, or/rev, with the harmonics thereof being integer multiples thereof. For 20 airfoils, the fundamental wake passing frequency is represented as 20/rev, with the higher order harmonics being 40/rev, 60/rev, etc.

Fan blade excitation may also be reduced by changing the spacing between the stator airfoils to eliminate the discrete excitations at the fundamental/rev and harmonics, and spread the vibratory excitation over many individual vibratory frequencies to distribute the excitation energy. However, although blade excitation and vibratory stress may be reduced at the fundamental wake passing frequency, vibratory stress may be undesirably increased at other resonant frequencies encountered during operation. Furthermore, irregular spacing of the stator airfoils can adversely affect aerodynamic performance including stall margin of a downstream compressor.

For these reasons, stator airfoils are typically uniformly spaced apart from each other in known production engines, with irregularly spaced apart stator airfoils not being known to exist in production.

Accordingly, it is desired to provide stator airfoils having reduced vibratory excitation on rotor blades while maintaining acceptable aerodynamic performance thereof.

BRIEF SUMMARY OF THE INVENTION

A stator includes a row of airfoils extending inwardly from a casing. The airfoils are spaced apart circumferentially from each other at a spacing varying in turn around the perimeter of the casing for reducing vibratory excitation of a downstream rotor stage.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
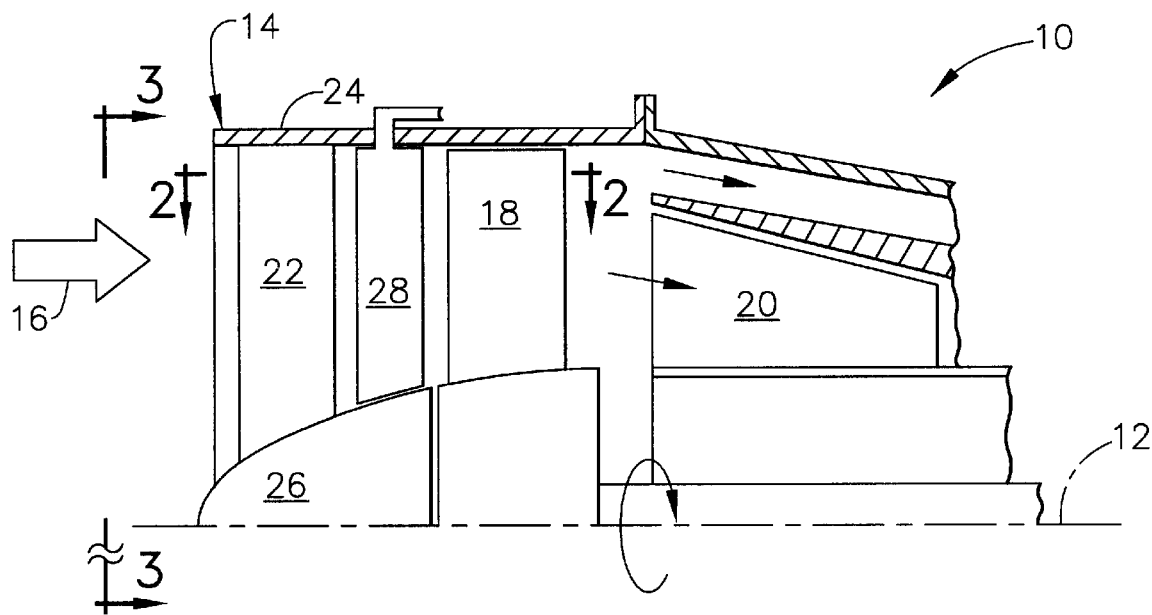
FIG. 1 is a partly sectional axial view of a portion of a turbofan gas turbine engine having a fan frame stator in accordance with an exemplary embodiment of the present invention.

Illustrated in FIG. 1 is the front portion of a turbofan gas turbine engine 10 which is axisymmetrical about an axial or longitudinal centerline axis 12. The engine includes a stator in the exemplary form of a front fan frame 14 which is configured for directing ambient air 16 to a row of fan rotor blades 18 extending radially outwardly from a supporting disk downstream from the front frame.

The fan may have one or more stages of fan blades as desired and is followed in turn by a conventional multi-stage axial compressor 20 which further compresses a portion of the air for mixing with fuel to generate combustion gases. The combustion gases are channeled to corresponding turbine stages (not shown) which power the compressor and fan in a conventional manner. An outer portion of the fan air bypasses the core engine and is discharged from the engine along with the combustion gases for producing thrust for propelling an aircraft in flight.

The fan frame or stator 14 includes a row of stator airfoils 22 extending radially inwardly from an annular outer casing 24, and radially outwardly from an annular inner hub 26. The fan frame airfoils 22 are typically referred to as struts since they provide a loadpath between the hub and casing for supporting one end of the fan rotor. The struts 22 may have any suitable aerodynamic profile such as the streamlined profile illustrated in FIG. 2, for reducing aerodynamic drag as the air 16 is channeled to the rotor blades 18.

Figure 2:
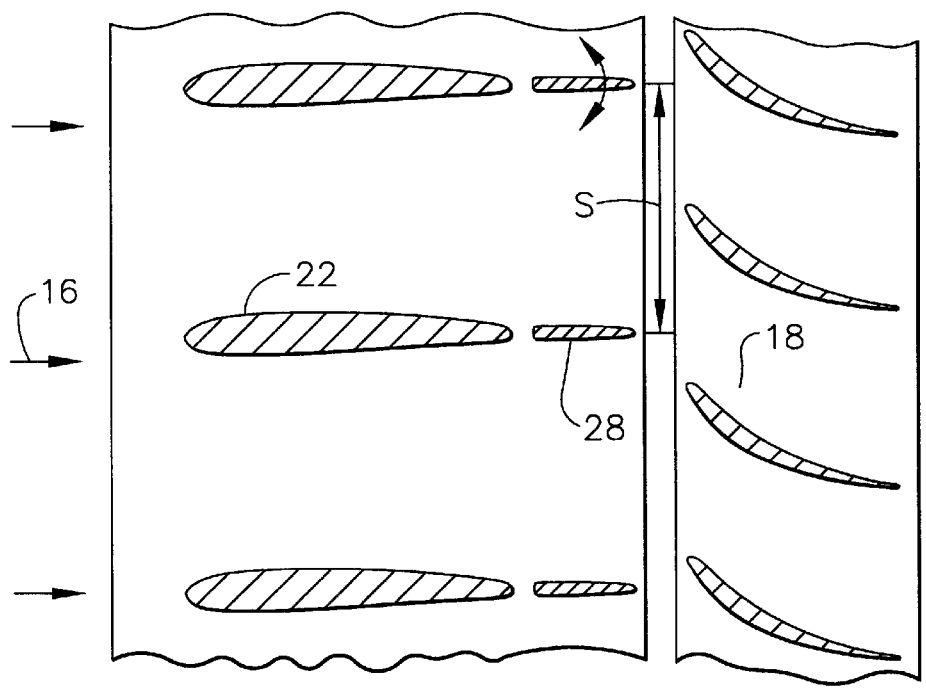
FIG. 2 is a planiform circumferential sectional view of a portion of the front frame and fan stage illustrated in FIG. 1, and taken along line 2—2.

As shown in FIGS. 1 and 2, the fan frame 14 may also include cooperating variable inlet guide vanes 28 mounted to the casing 24 in axial alignment with corresponding ones of the struts 22 at downstream trailing edges thereof. The struts and vanes have suitable airfoil profiles individually and collectively for guiding the ambient air 16 into the fan in any conventional manner.

As indicated above, conventional fan struts, and cooperating inlet guide vanes, are normally uniformly or equally spaced apart from each other circumferentially for ensuring suitable aerodynamic performance of the fan as well as the downstream compressor. However, the total number of struts or vanes around the perimeter of the frame create a fundamental wake passing frequency with the downstream fan blades 18, with corresponding higher order harmonics, which can lead to vibratory excitation of one or more of the resonant vibratory modes of the blades as the engine is operated over various rotor speeds, typically expressed in revolutions per minute.

In accordance with a preferred embodiment of the present invention, the stator airfoils of the fan front frame 14, including the struts 22 and vanes 28 thereof, are spaced apart circumferentially from each other at a circumferential spacing S as illustrated in FIG. 2 which varies in turn from airfoil to airfoil around the full perimeter of the casing 24.

Figure 3:
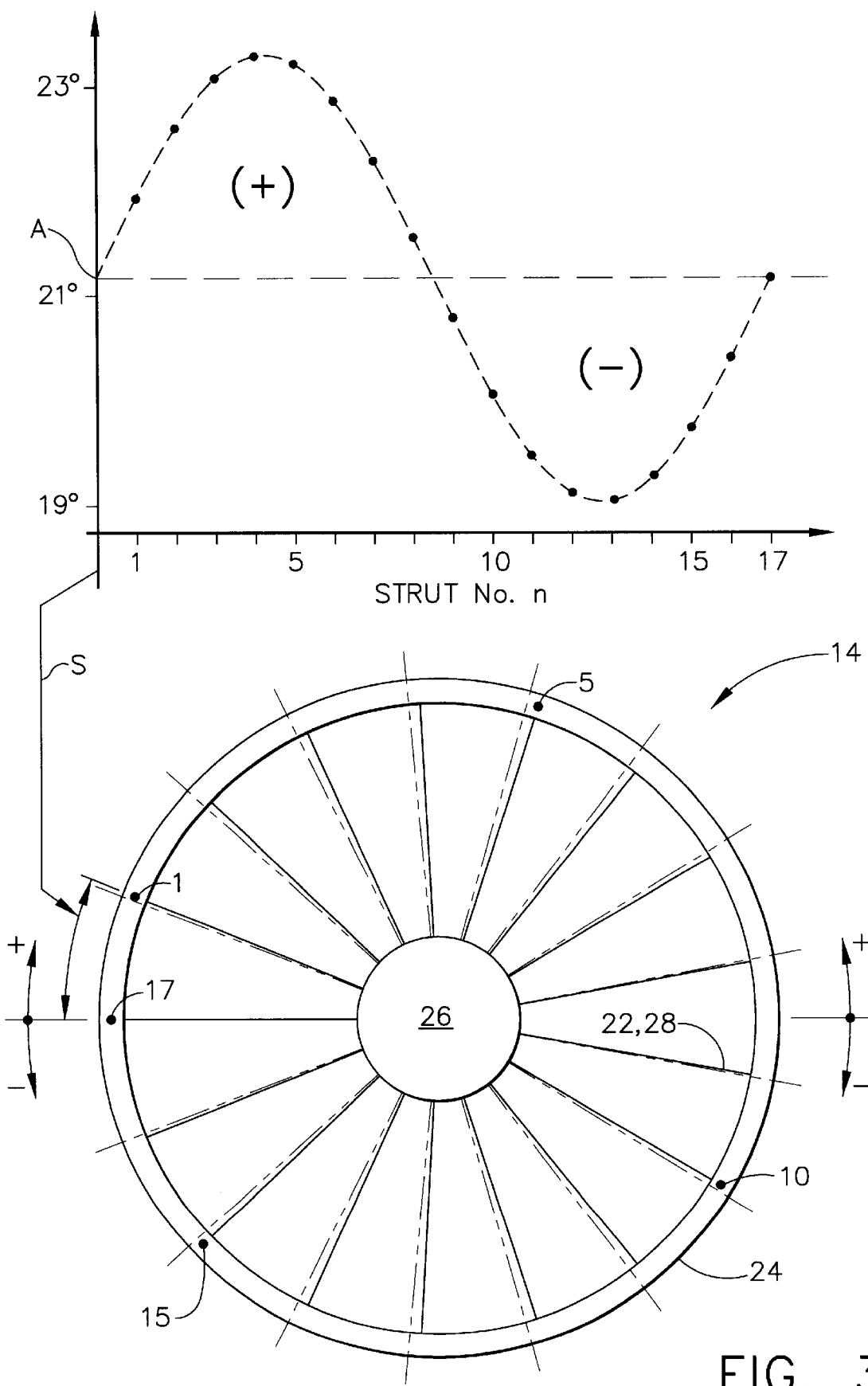
FIG. 3 is a partly schematic view of the front frame illustrated in FIG. 1 and taken along line 3—3 to show variable spacing of airfoils therein in accordance with an exemplary embodiment of the present invention.

In the exemplary embodiment illustrated in FIGS. 2 and 3, there are seventeen (17) total struts 22 around the full 360° perimeter of the casing 24, and similarly seventeen corresponding vanes 28. The product of the total number of struts or vanes and the rotational speed of the fan defines a nominal wake passing frequency with the fan, which may be represented as 17/rev. For uniformly spaced apart stator airfoils, the fundamental excitation frequency or wake passing frequency is 17/rev, with higher order harmonics thereof being integer multiples including 34/rev as the first harmonic and 51/rev as the second harmonic.

For equally spaced stator airfoils, the 17/rev fundamental frequency effects the maximum relative strength of the pressure wakes from the airfoils, with the relative wake strength decreasing in turn for the corresponding higher order harmonics.

By slightly varying in turn the circumferential spacing S from airfoil to airfoil in the fan frame, the wake passing frequencies are distributed around the nominal wake passing frequency and its harmonics to correspondingly distribute the wake energy over a larger number of excitation frequencies. Correspondingly, the relative wake strength for each of the excited frequencies is relatively low, with the relative wake strength of the nominal 17/rev frequency and its harmonics being substantially reduced over those for equally spaced stator airfoils.

It is preferred to vary the circumferential spacing S from airfoil to airfoil gradually in a periodic manner for not only reducing excitation from the wake passing frequencies but also limiting adverse aerodynamic performance of the downstream components including the compressor. Aerodynamic performance of the fan and compressor, and stall margin of the compressor must be maintained while reducing vibratory response of these components due to the pressure wakes effected by the fan frame. Gradual spacing change also reduces adverse performance effects due to typical manufacturing tolerances in circumferential position.

In the preferred embodiment illustrated in FIG. 3, the strut and vane airfoils 22,28 have a greater circumferential spacing varying in turn on a first circumferential side of the casing than on a diametrically opposite second circumferential side thereof, wherein the airfoil spacing is less than on the first side while still varying in turn on the second side.

As shown in FIG. 2, the circumferential spacing S between the struts and vanes is represented by the center-to-enter pitch spacing of those airfoils. Since these airfoils typically have identical radial cross-sections or profiles, the actual circumferential spacing between the airfoils, which defines the flow passages for the air 16, correspondingly varies with the pitch spacing S.

Referring again to FIG. 3, the struts and vanes preferably vary in circumferential spacing around the casing 24 in a single period corresponding with the 360° perimeter of the casing. In this way, the circumferential spacing of the struts and vanes may vary from a nominal or equal spacing thereof by a distribution that is essentially a one per rev basis. In other words, around the full perimeter of the casing the circumferential spacing of the airfoils varies from airfoil to airfoil in turn with a greater extent on the first side and a lesser extent on the opposite second side to correspondingly distribute the resulting wake passing frequencies.

For example, instead of a fundamental wake passing frequency having maximum relative wake strength at 17/rev, the fundamental frequency becomes 1/rev, and wake excitation is distributed over several frequencies in a broad range below and above the 17/rev value, all with correspondingly lower relative wake strength. Similarity, the discrete wake harmonic frequencies at 34/rev and 51/rev are replaced with distributed ranges of harmonic frequencies below and above those discrete frequencies, again with correspondingly lower relative wake strength.

In this way, the stator airfoils no longer effect a fundamental wake passing frequency of 17/rev corresponding with the total number per row, but instead effect a fundamental wake passing frequency of 1/rev corresponding with a single one of the stator airfoils. A larger number of harmonic wake passing frequencies are then distributed over a larger range of frequencies covering the 17/rev through 51/rev frequency range for the first three vibratory modes.

In the preferred embodiment illustrated in FIG. 3, the circumferential spacing S is preferably sinusoidal with a single period corresponding with the 360° perimeter of the casing. For example, the circumferential spacing S between circumferentially adjacent struts and vanes may be represented by the following equation: $S=A+B \times \mathrm{Sin}(n/N \times 2\pi)$. The index n represents the strut number or corresponding passage location adjacent thereto, and N represents the total number of struts or vanes around the perimeter. The constant A represents the nominal, equal spacing for the total number of struts or vanes around the perimeter. The constant B represents the limit of variation of the circumferential spacing around the perimeter of the casing.

For the total number N=17 for the row of struts or vanes, the nominal circumferential spacing A is simply 360°/17= 21.2°, which is shown as a dashed horizontal line in the top graph of FIG. 1, and as phantom radial lines in the row of airfoils therebelow. The maximum variation in circumferential spacing is represented by the constant B and may have any suitable value. The sinusoidal distribution of the circumferential spacing results in a greater spacing for the airfoils on one side of the casing and a lesser spacing for the airfoils on the opposite side of the casing corresponding with the symmetrical distribution of a typical sine wave. The greater or expanded circumferential spacing is represented by the plus (+) sign in FIG. 3, with the lesser or closer circumferential spacing being represented by the minus (−) sign, all relative to the nominal circumferential spacing A.

In a preferred embodiment, the greater (+) circumferential spacing S is up to about 10% greater than the uniform nominal spacing A for the total number of airfoils around the perimeter of the casing, with the lesser (−) circumferential spacing being up to about 10% less than the nominal spacing A. The constant B in the above equation may therefore have a value which is 10% of the nominal value A in this example. In alternate embodiments, the variation in circumferential spacing may be up to about 15% for enjoying the benefits of reduced wake excitation of the fan blades while limiting undesirable change in aerodynamic performance of the fan and downstream compressor.

The seventeen struts or vanes clockwise around the perimeter of the casing illustrated in FIG. 3, and their corresponding flow passages therebetween, are identified by the index numbers n ranging from 1 to 17. The corresponding circumferential spacing for the struts and vanes is illustrated in the graph and expressed in degrees. The circumferential spacing between the first and second struts 1 and 2, or corresponding vanes, is slightly larger than the nominal spacing A, with the spacing increasing in turn from airfoil to airfoil to a maximum circumferential spacing in the sine wave between the fifth and sixth struts 5 and 6. The circumferential spacing then decreases for struts 6,7,8, with the spacing between struts 8 and 9 being slightly above the nominal spacing A.

The spacing continues to decrease to below the nominal spacing, at zero sine wave value, for struts 9,10,11, and 12, with the circumferential spacing at struts 12 and 13 having similar minimum values near the minimum sine wave value. The circumferential spacing then increases for struts 13 through 17, with the spacing between strut 17 and strut 1 having the nominal value A at the zero sine wave value.

Although the preferred distribution of the circumferential spacing of the frame airfoils varies sinusoidally in the preferred embodiment, other continuously varying periodic distributions may be used for distributing wake excitation of the fan blades over expanded frequency ranges for reducing the relative strength thereof. The spacing distribution may be optimized to reduce the interaction between wake excitation frequencies and any excitable resonant frequencies of the fan blades. The smoothly varying spacing distribution around the perimeter of the fan casing may be used to limit any adverse aerodynamic effect on fan and compressor performance attributable to the fan frame while reducing vibratory stress and strain therein.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured letters patent of the United States is the invention as defined and differentiated in the following claims in which we claim:

1. A stator configured for channeling inlet air through an inlet end of a gas turbine engine into a row of fan rotor blades, and comprising a row of airfoils extending radially inwardly from a casing for channeling said air to said fan rotor blades, and spaced circumferentially apart from each other at a periodic spacing varying in turn around the perimeter of said casing for reducing wake excitation of said fan rotor blades from said airfoils.

2. A stator according to claim 1 wherein said airfoils have a greater circumferential spacing varying in turn on one side of said casing than on an opposite side thereof having a lesser circumferential spacing varying in turn.

3. A stator according to claim 2 wherein said airfoils vary in circumferential spacing around said casing in a period corresponding with said casing perimeter.

4. A stator according to claim 3 wherein said circumferential spacing is sinusoidal.

5. A stator according to claim 3 wherein said greater circumferential spacing is up to about 10% greater than a uniform nominal spacing of the total number of airfoils in said casing, and said lesser circumferential spacing is up to about 10% less than said nominal spacing.

6. A stator according to claim 3 in the form of a fan front frame wherein said airfoils comprise struts configured for directing air to said row of fan rotor blades downstream therefrom.

7. A frame according to claim 6 wherein said airfoils further comprise inlet guide vanes mounted to said casing in alignment with corresponding ones of said struts.

8. A fan frame comprising a row of struts extending radially between an outer casing and inner hub, and spaced circumferentially apart from each other at a periodic spacing varying in turn around the perimeter of said casing.

9. A frame according to claim 8 wherein said struts have a greater circumferential spacing varying in turn on one side of said casing than on an opposite side thereof having a lesser circumferential spacing varying in turn.

10. A frame according to claim 9 wherein said struts vary in circumferential spacing around said casing in a period corresponding with said casing perimeter.

11. A frame according to claim 10 wherein said circumferential spacing is sinusoidal.

12. A frame according to claim 10 wherein said greater circumferential spacing is up to about 10% greater than a uniform nominal spacing of the total number of airfoils in said casing, and said lesser circumferential spacing is up to about 10% less than said nominal spacing.

13. A fan frame comprising a row of aligned struts and vanes extending radially between an outer casing and an inner hub, and spaced circumferentially apart from each other at a periodic spacing varying in turn around the perimeter of said casing.

14. A frame according to claim 13 wherein said struts and vanes have a greater circumferential spacing varying in turn on one side of said casing than on an opposite side thereof having a lesser circumferential spacing varying in turn.

15. A frame according to claim 14 wherein said struts and vanes vary in circumferential spacing around said casing in a period corresponding with said casing perimeter.

16. A frame according to claim 15 wherein said circumferential spacing is sinusoidal.

17. A frame according to claim 15 wherein said greater circumferential spacing is up to about 10% greater than a uniform nominal spacing of the total number of airfoils in said casing, and said lesser circumferential spacing is up to about 10% less than said nominal spacing.

18. A frame according to claim 14 further comprising a rotor supported at one end in said hub, and including a row of fan rotor blades disposed directly downstream of said vanes.

19. A frame according to claim 18 wherein said vanes are variable in angular position.

20. A frame according to claim 19 wherein said struts have a streamlined profile.

* * * * *